United States Patent
Muller et al.

(10) Patent No.: US 10,796,327 B2
(45) Date of Patent: Oct. 6, 2020

(54) SYSTEM AND METHOD OF SAFELY DISTRIBUTING HIGH DEMAND PRODUCTS

(71) Applicant: GPShopper, LLC, New York, NY (US)

(72) Inventors: Alex Muller, New York, NY (US); Yan Makher, New York, NY (US); Thomas Kulesza, New York, NY (US); Kimberly Dorn, New York, NY (US); Travis Watson, New York, NY (US); Brad DeWitt, New York, NY (US)

(73) Assignee: Synchrony Bank, Stamford, CT (US)

( * ) Notice: Subject to any disclaimer, the term of this patent is extended or adjusted under 35 U.S.C. 154(b) by 322 days.

(21) Appl. No.: 15/882,639

(22) Filed: Jan. 29, 2018

(65) Prior Publication Data
US 2019/0236632 A1  Aug. 1, 2019

(51) Int. Cl.
G06Q 30/00 (2012.01)
G06Q 30/02 (2012.01)
G06Q 30/06 (2012.01)
G07C 15/00 (2006.01)

(52) U.S. Cl.
CPC ..... *G06Q 30/0212* (2013.01); *G06Q 30/0633* (2013.01); *G07C 15/006* (2013.01)

(58) Field of Classification Search
None
See application file for complete search history.

(56) References Cited

U.S. PATENT DOCUMENTS

| | | | |
|---|---|---|---|
| 2007/0233291 A1* | 10/2007 | Herde | G06Q 10/02 700/91 |
| 2014/0089016 A1* | 3/2014 | Smullin | G06Q 10/02 705/5 |
| 2016/0092943 A1* | 3/2016 | Vigier | G06Q 30/0281 705/346 |
| 2016/0343057 A1* | 11/2016 | Andon | G06Q 10/02 |
| 2016/0364790 A1* | 12/2016 | Lanpher | G06Q 30/0637 |

\* cited by examiner

*Primary Examiner* — Meredith A Long
(74) *Attorney, Agent, or Firm* — Polsinelli (57) ABSTRACT

A system for use with computing devices each associated with one of a plurality of customers. The system includes a customer application executing on each of the computing devices and a computing system that receives requests, from a requesting portion of the computing devices, to purchase a product not yet available for purchase. The computing system assigns potential reservations to selected winning ones of the customers associated with the requesting portion, receives confirmations from a confirmed portion of the selected winning customers, converts the potential reservations to actual reservations for the confirmed portion, and transmits a code to each of the confirmed portion of the selected winning customers only after the selected winning customer submits validation information that the computing system determines satisfies validation criteria. A merchant transfers the product to one of the customers at a physical store location only if the customer provides the code to the merchant.

25 Claims, 8 Drawing Sheets

SYSTEM AND METHOD OF SAFELY DISTRIBUTING HIGH DEMAND PRODUCTS

BACKGROUND OF THE INVENTION

Field of the Invention

The present invention is directed generally to methods of improving customer safety and particularly to methods of safely distributing high demand products.

Description of the Related Art

If a customer wishes to receive an instance of a product immediately, that customer is typically required to travel to a physical store location to pick up the instance of the product. This can create problems when the product is in high demand. High demand products, such as limited edition sneakers, concert tickets, iPhones, movie tickets, and limited edition items, can cause lines, public disturbance, theft, violence, or even death. Therefore, a need exists for new and improved methods of distributing and/or obtaining such products. The present application provides these and other advantages as will be apparent from the following detailed description and accompanying figures.

BRIEF DESCRIPTION OF THE SEVERAL VIEWS OF THE DRAWING(S)

Like reference numerals have been used in the figures to identify like components.

DETAILED DESCRIPTION OF THE INVENTION

Figure 1:
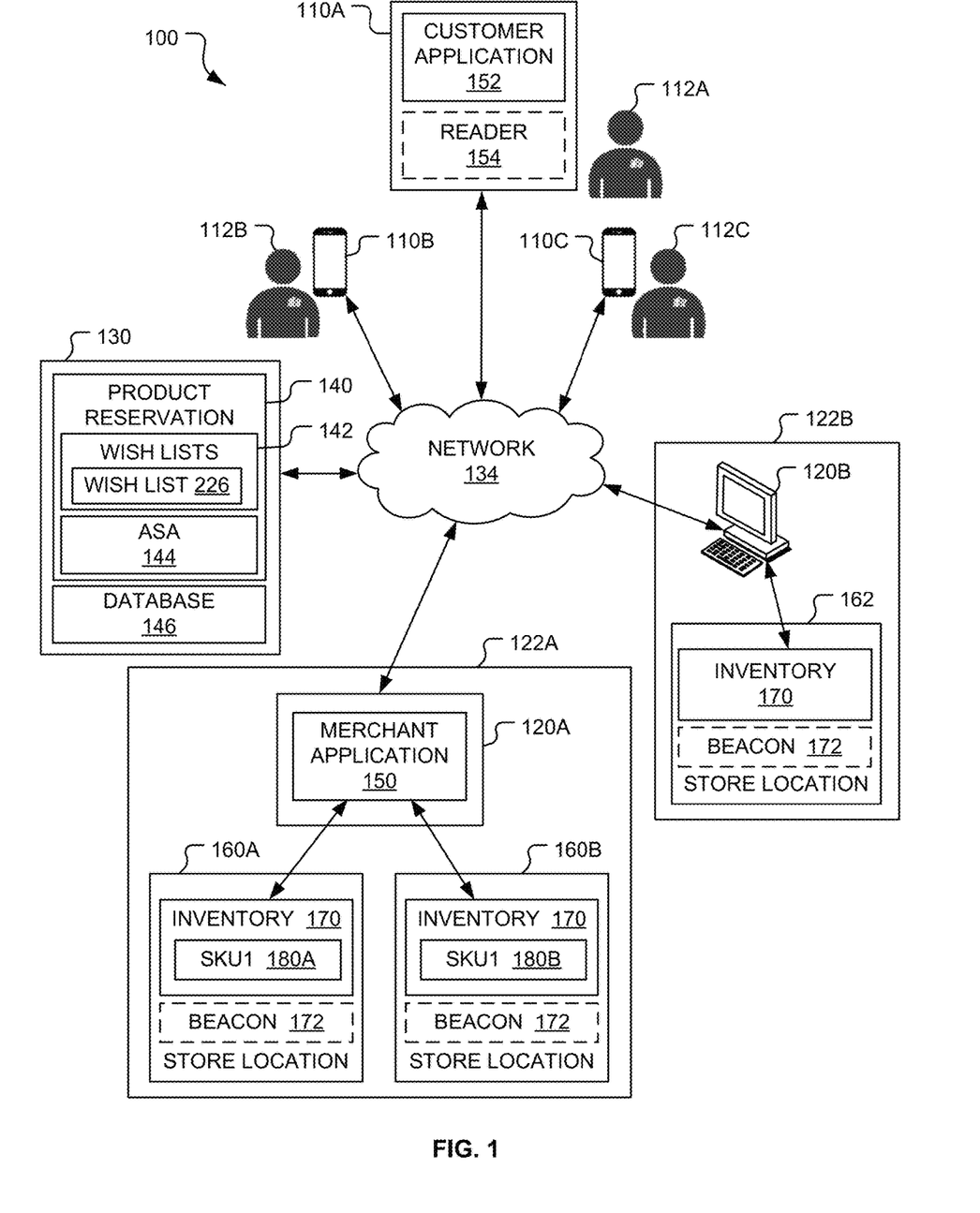
FIG. 1 is a block diagram of a system configured to help distribute high demand products safely.

FIG. 1 is a block diagram of a system 100 that may be used to mitigate the danger associated with selling high demand products by eliminating in-store lines and related public disturbances, theft, and/or violence. The system 100 includes customer computing devices 110A-110C (e.g., cellular telephones or similar mobile devices) operated by customers 112A-112C, respectively, merchant computing systems 120A and 120B operated by merchants 122A and 122B, respectively, and a product reservation computing system 130. The product reservation computing system 130 may be characterized as being a remote computing system with respect to the customer computing devices 110A-110C and/or the merchant computing systems 120A and 120B.

The system 100 may include any number of customer computing devices each like the customer computing devices 110A-110C and each operated by a different customer. However, for ease of illustration, only the three customer computing devices 110A-110C have been illustrated and will be described below. Nevertheless, each of the customer computing devices may include substantially identical components and be configured to perform the same functions attributed to the customer computing devices 110A-110C. Similarly, the system 100 may include any number of merchant computing systems each like the merchant computing systems 120A and 120B each operated by a different merchant. However, for ease of illustration, only the merchant computing systems 120A and 120B have been illustrated and will be described below. Nevertheless, each of the merchant computing systems may include substantially identical components and be configured to perform the same functions attributed to the merchant computing systems 120A and 120B.

Figure 11:
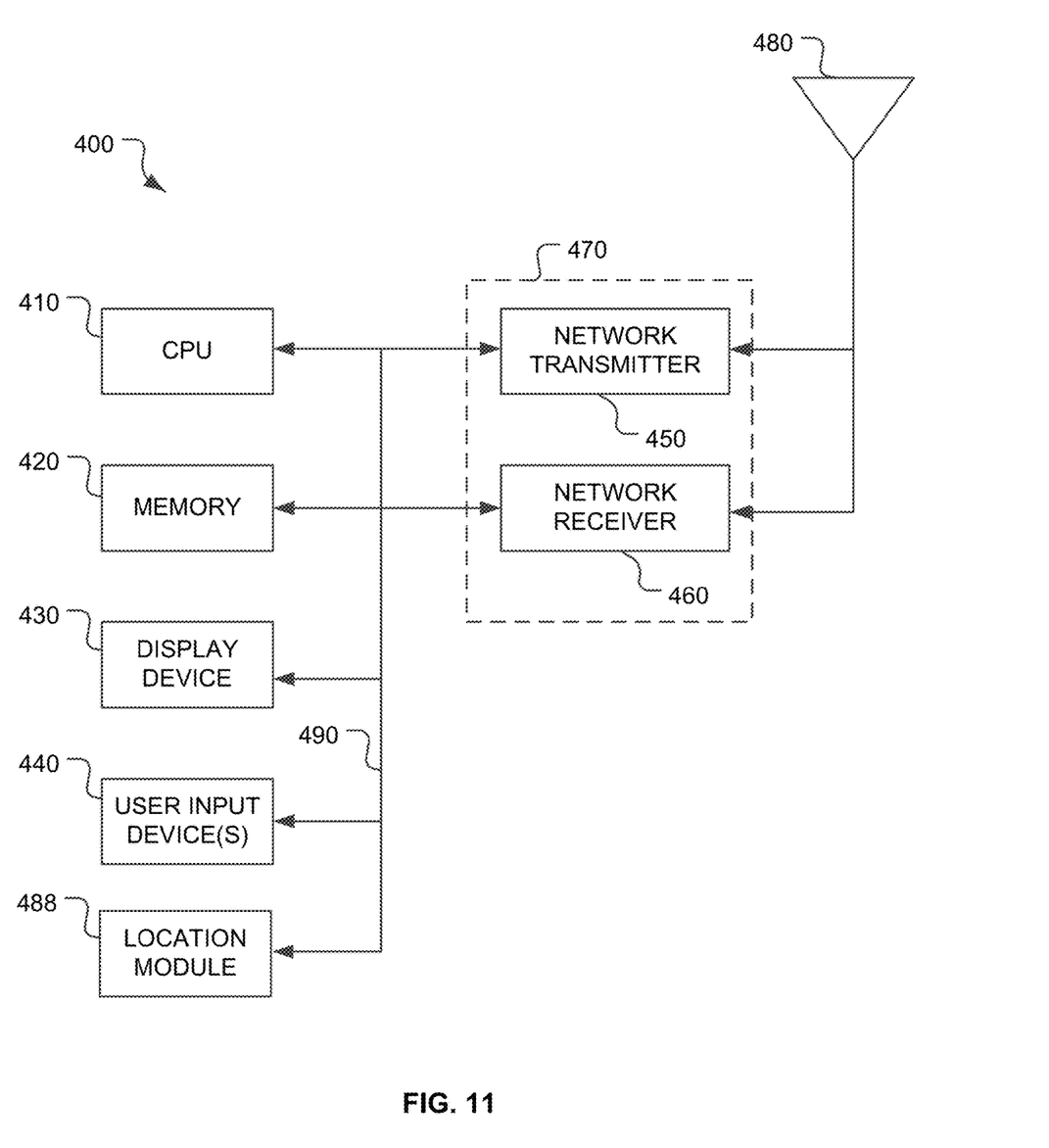
FIG. 11 is a diagram of a hardware environment and an operating environment in which the customer computing devices of FIG. 1 may be implemented.

By way of a non-limiting example, each of the customer computing devices 110A-110C may be implemented as a mobile communication device 400 (illustrated in FIG. 11 and described). By way of another non-limiting example, each of the customer computing devices 110A-110C may be implemented as a computing device 12 (illustrated in FIG. 12 and described below). By way of yet another non-limiting example, the merchant computing systems 120A and 120B and the product reservation computing system 130 may each be implemented using one or more computing devices (e.g., each like the computing device 12 illustrated in FIG. 12 and described below).

Referring to FIG. 1, each of the customer computing devices 110A-110C implements a customer application 152 and, optionally, a reader application 154. The customer application 152 is configured to communicate with the product reservation computing system 130 over one or more networks 134 (e.g., a cellular network, the plain old telephone service ("POTS"), and/or the Internet). Similarly, each of the merchant computing systems 120A and 120B implements a merchant application 150 configured to communicate with the product reservation computing system 130 over the network(s) 134 (e.g., the Internet, a payment processing network, and the like). Optionally, the customer computing devices 110A-110C may be configured to communicate with the merchant computing systems 120A and 120B over the network(s) 134 (e.g., the cellular network, the POTS, and/or the Internet).

Each of the merchants 122A and 122B operates one or more physical store locations. For example, in FIG. 1, the merchant 122A operates store locations 160A and 160B. Similarly, the merchant 122B operates a store location 162. Each of the store locations 160A, 160B, and 162 has an inventory 170 of products for sale and an optional proximity beacon 172. The inventory 170 of the store locations 160A and 160B includes inventories 180A and 180B, respectively, of a product "SKU1." The product "SKU1" may be a particular Stock Keeping Unit ("SKU"). By way of a non-limiting example, the product "SKU1" may be a white T-shirt.

Figure 10:
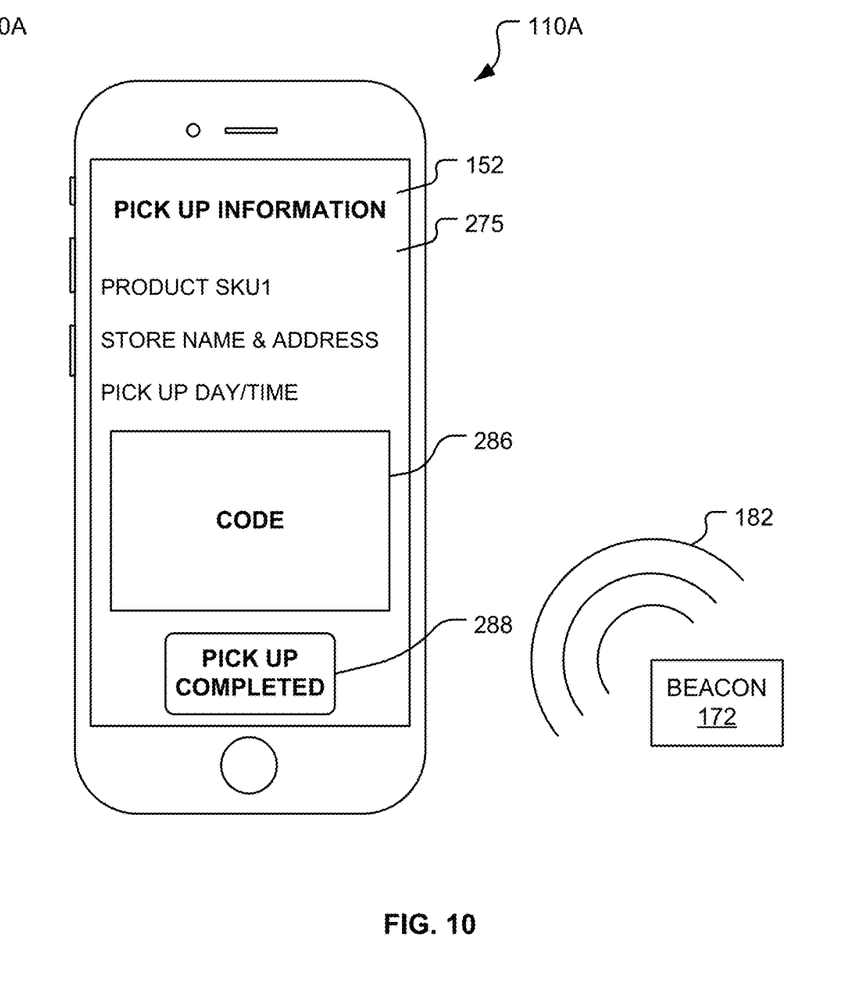
FIG. 10 is an illustration of a product pick up page displayed by one of the customer computing devices of the system of FIG. 1.

Referring to FIG. 10, each of the optional proximity beacons 172 transmits a wireless proximity signal 182. The proximity signal 182 transmitted by each of the proximity beacons 172 may include a store location code that is unique. Thus, referring to FIG. 1, the proximity beacons 172 at the store locations 160A, 160B, and 162 may each transmit a different store location code.

The reader application 154 is configured to detect the proximity signal 182 (see FIG. 10) and read the store location code therefrom. The customer application 152 is configured to obtain the store location code from the reader application 154 and forward the store location code to the product reservation computing system 130. The product reservation computing system 130 associates each of the unique store location codes with a different one of the store locations 160A, 160B, and 162. Thus, the product reservation computing system 130 may use the unique store location codes to confirm whether the customer computing device 110A is at a particular one of the store locations 160A, 160B, and 162.

The product reservation computing system 130 is configured to facilitate the sale of high-demand products by collecting requests for reservations for a particular product (e.g., the product "SKU1") and selecting (e.g., via a lottery process) those of the customers 112A-112C who will be allowed to purchase the particular product. The product reservation computing system 130 implements a product reservation module 140 that includes a collection of wish lists 142 and an Assignment Script Algorithm ("ASA") 144. The product reservation computing system 130 may also implement a database 146.

The product reservation module 140 may be characterized as a comprehensive Internet-based application for managing and loading an inventory of products and marketing the products. In particular, the product reservation module 140 may be used to launch a new high demand product safely. For example, the merchant 122A may enter launch information into the product reservation module 140. Then, the product reservation module 140 may receive requests for the product from the customers 112A-112C (e.g., via the customer application 152 executing on the customer computing devices 110A-110C, respectively). Next, the product reservation module 140 determines which of the customers 112A-112C has won (e.g., via a lottery process) the opportunity to purchase the product and assigns potential reservations to such winning customers. At this point, the winning customers must confirm that they are planning on picking up the product at one of the merchant's store locations. The product reservation module 140 converts the potential reservation to an actual reservation for each winning customer who confirms that the winning customer will pick up the product. Next, those of the winning customers with actual reservations either pick up the product at one of the merchant's physical store locations or fail to pick up the product.

Figure 2:
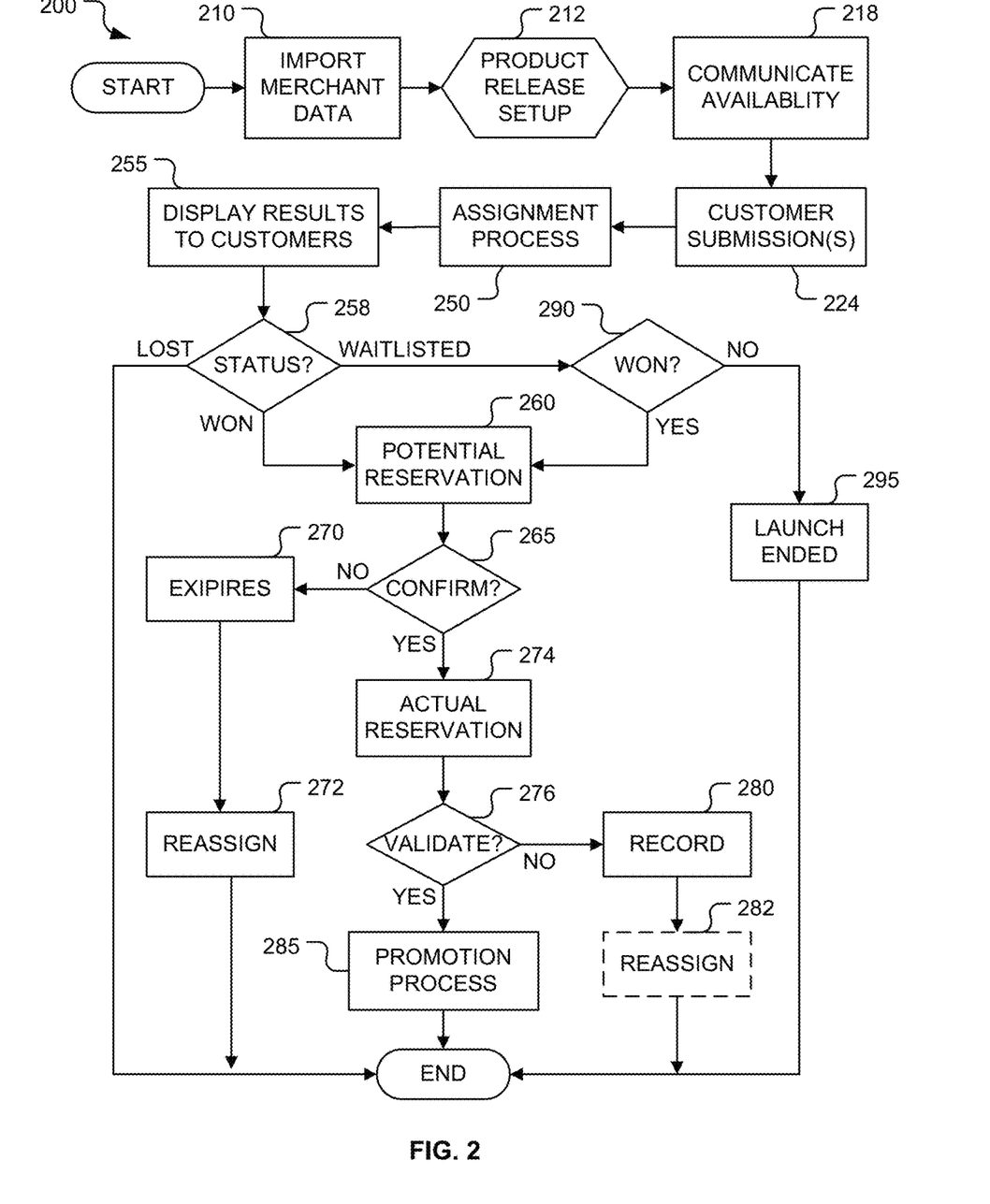
FIG. 2 is a flow diagram of a method performed by the system of FIG. 1.

FIG. 2 is a flow diagram of a method 200 performed by the system 100 (see FIG. 1). Referring to FIG. 1, for ease of illustration, the functionality of the system 100 will be described with respect a product launch of the product "SKU1" by the merchant 122A and the customer 112A who wishes to obtain the product "SKU1."

In first block 210 (see FIG. 2), an import merchant data process is performed by the product reservation computing system 130 and the merchant computing system 120A. During the import merchant data process, the product reservation module 140 receives information from the merchant application 150 operated by the merchant 122A regarding the in-store inventory 170 at one or both of the store locations 160A and 160B and stores this information (e.g., in the database 146). For example, in block 210 (see FIG. 2), the product reservation module 140 may receive the inventories 180A and 180B, respectively, of the product "SKU1" and store them in the database 146. Thus, the product reservation computing system 130 may allow the merchant 122A to load in one or more of the inventories 180A and 180B of one or more high demand products (e.g., the product "SKU1") at one or more of the store locations 160A and 160B.

In next block 212 (see FIG. 2), a product release setup process is performed by the product reservation computing system 130 and the merchant computing system 120A. During the product release setup process, the product reservation module 140 receives an indication from the merchant application 150 executing on the merchant computing system 120A that the merchant 122A wishes to make the product "SKU1" available for reservation or wishes to launch the product "SKU1." For example, if the product "SKU1" has not been entered into the product reservation module 140, the merchant 122A may enter the product "SKU1." The merchant 122A may identify any product options (e.g., size, color, etc.) associated with the product "SKU1." The merchant 122A may also identify those of the store locations 160A and 160B where the product "SKU1" is or will be available as well as inventory data related to the product "SKU1." For example, the merchant 122A may enter an amount of the product "SKU1" available for each product option (e.g., size, color, etc.) at each of the store locations 160A and 160B where the product "SKU1" is or will be available. In addition, the merchant 122A may enter a name associated with the product "SKU1" as well as a manufacturer of and/or a brand associated with the product "SKU1." Thus, the merchant 122A instantiates the availability of the product "SKU1" using the product reservation module 140. The merchant 122A may also provide additional launch information, such as when (e.g., date and time) the product "SKU1" will be available for purchase (e.g., at one or both of the store locations 160A and 160B).

Figure 8:
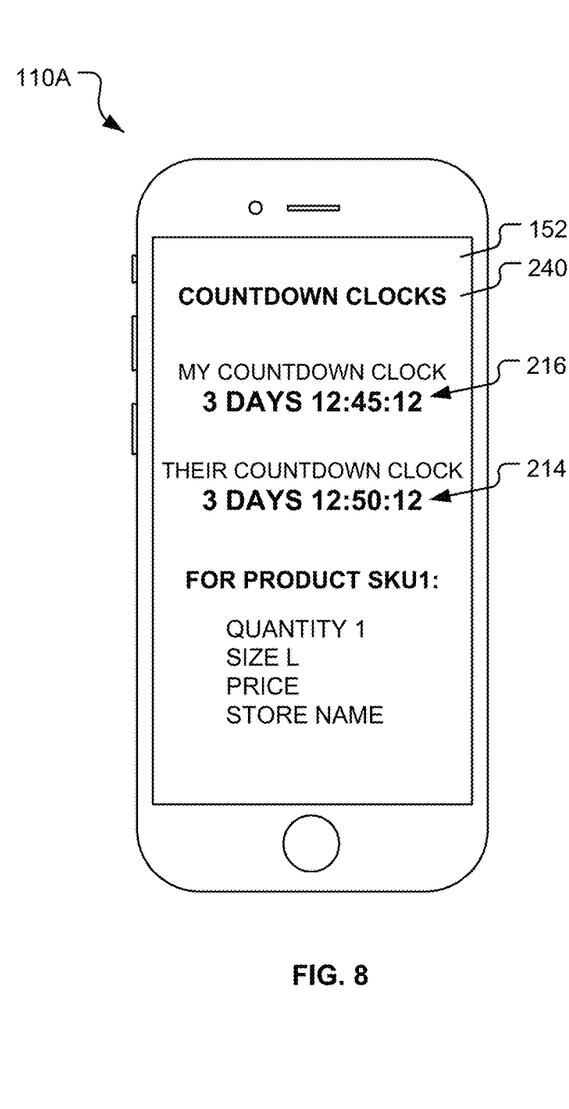
FIG. 8 is an illustration of a countdown page displayed by one of the customer computing devices of the system of FIG. 1.

The product reservation module 140 may use the date and time when the product "SKU1" will be available for purchase to generate a default countdown clock 214 (see FIG. 8). The default countdown clock 214 (see FIG. 8) indicates a default amount of time until the product reservation module 140 determines which of the customers 112A-112C will be given an opportunity to purchase the product "SKU1." However, as will be explained below, the product reservation module 140 may generate a different personal countdown clock 216 (see FIG. 8) for each of the customers 112A-112C. When first generated, the personal countdown clock 216 (see FIG. 8) may be identical to the default countdown clock 214 (see FIG. 8). However, the personal countdown clock 216 (see FIG. 8) for at least a portion of the customers 112A-112C may indicates a modified amount of time until the product reservation module 140 will determine whether the portion of the customers 112A-112C will be given an opportunity to purchase the product "SKU1." For example, the customer 112A may qualify for a head start, which is applied to the personal countdown clock 216 (see FIG. 8) for the customer 112A. Thus, the personal countdown clock 216 (see FIG. 8) for the customer 112A will count down to zero before the default countdown clock 214 (see FIG. 8) and possibly before the personal countdown clocks of other customers. This increases the likelihood that the customer 112A will be assigned a potential reservation by the product reservation module 140.

Figure 3:
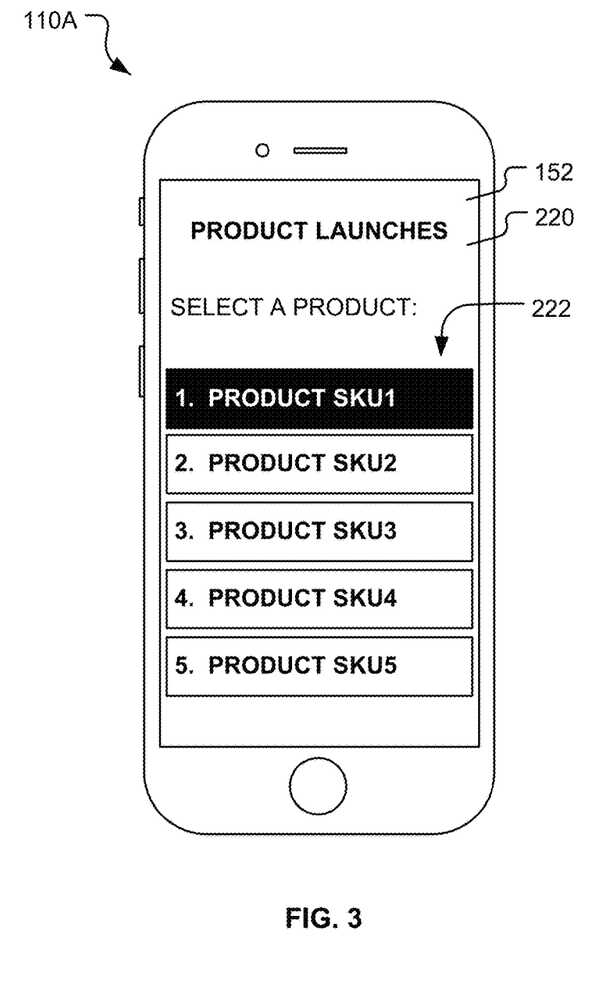
FIG. 3 is an illustration of a product launch page displayed by one of the customer computing devices of the system of FIG. 1.

In block 218 (see FIG. 2), the product reservation module 140 communicates via digital means (e.g., an email, a push notification, a text message, and other digital means) the availability of the product "SKU1" to the customer application 152 executing on each of the customer computing devices 110A-110C. Referring to FIG. 3, the customer application 152 may display a product launch page 220 that includes a list 222 of products available to the customers 112A-112C (see FIG. 1) for reservation. In FIG. 3, the list 222 includes the product "SKU1" along with other products "SKU2" to "SKU5." Optionally, referring to FIG. 1, the product reservation module 140 may prevent each of the customers 112A-112C from following or selecting a product, if that product is not available within a predetermined distance of the customer. In block 224 (see FIG. 2), the product reservation module 140 receives one or more customer submissions from the customer application 152 executing on each of a requesting portion of the customer computing devices 110A-110C. The customer submission(s) received from each of the requesting portion include a selection of at least one of the products "SKU1" to "SKU5." Referring to FIG. 1, the product reservation module 140 adds the selection received from each of the requesting portion to a wish list in the collection of wish lists 142 that is associated with the customer operating the customer computing device from which the selection was received. For example, in FIG. 3, the customer 112A (see FIG. 1) selects (e.g., using a display device 430 illustrated in FIG. 11) the product "SKU1" from the list 222. Thus, referring to FIG. 1, the requesting portion includes the customer computing device 110A operated by the customer 112A. The product reservation module 140 adds the product "SKU1" to a wish list 226 associated with the customer 112A.

Optionally, after the product reservation module 140 receives the customer submission, the product reservation module 140 may send product information related to the product "SKU1" to the customer application 152. The customer application 152 may display the product information on a product page 228 (see FIGS. 4 and 6). In the example illustrated in FIG. 4, the product page 228 includes a selectable store option 230A that, when selected, allows the customer 112A (see FIG. 1) to select a store in which to request the reservation.

Figure 4:
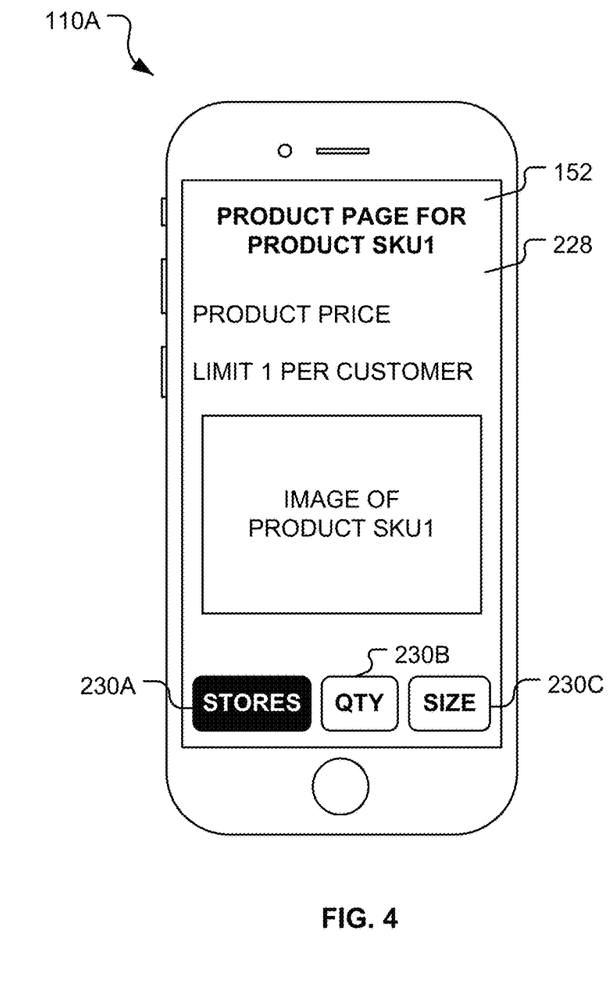
FIG. 4 is an illustration of a product page displayed by one of the customer computing devices of the system of FIG. 1.
Figure 5:
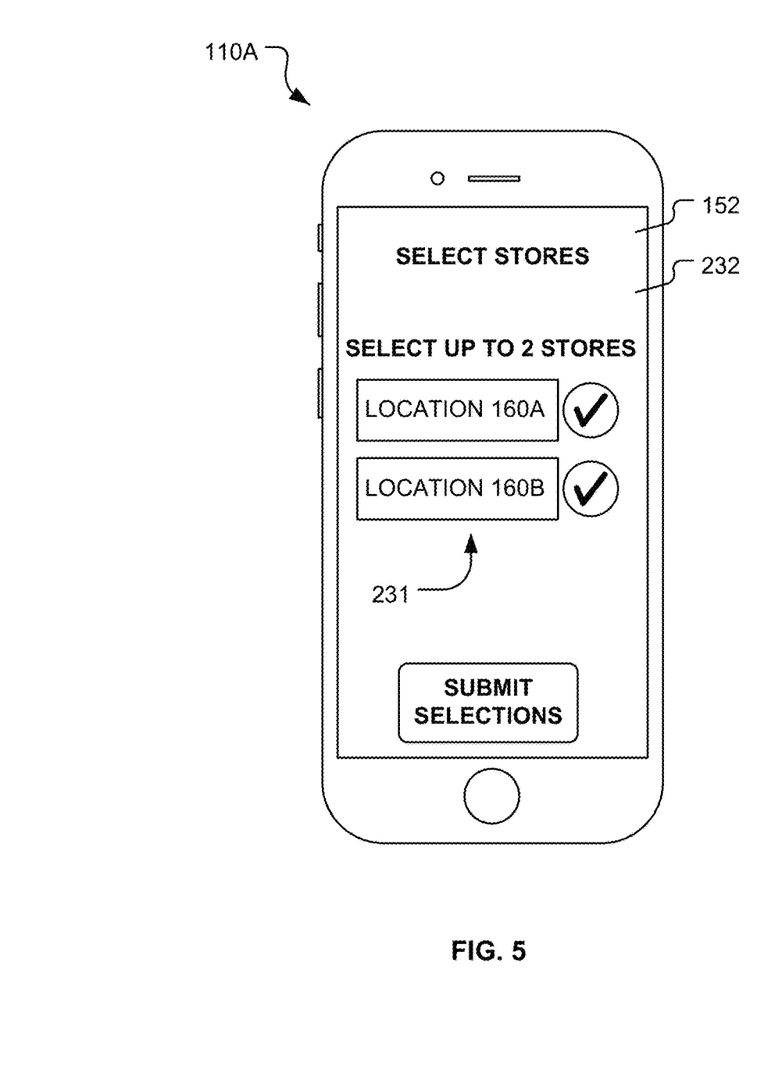
FIG. 5 is an illustration of a store selection page displayed by one of the customer computing devices of the system of FIG. 1.

Referring to FIG. 5, after the customer 112A (see FIG. 1) selects the store option 230A (see FIG. 4), the customer application 152 may display a list 231 of store locations on a store selection page 232. For example, the store selection page 232 may display one or more of the store locations 160A and 160G (see FIG. 1) whereat the product "SKU1" is available for purchase. Then, referring to FIG. 1, the customer 112A may choose at least one of the store locations 160A and 160B in the list 231 (see FIG. 1). In the example illustrated in FIG. 5, the store selection page 232 allows the customer 112A (see FIG. 1) to choose up to two locations and the customer 112A has chosen both of the store locations 160A and 160B (see FIG. 1).

Alternatively, referring to FIG. 1, the product reservation module 140 may automatically select one or more of the store locations 160A and 160B. These automatic selections may be based at least in part on inventory rules defined in the product reservation module 140 and/or based at least in part on which of the store locations 160A and 160B is the closest (e.g., to a home address of the customer 112A, a current location of the customer 112A, and the like).

Optionally, referring to FIG. 4, the product reservation module 140 (see FIG. 1) may send one or more selectable product options 230B and 230B (e.g., size, quantity, etc.) to the customer application 152 that the customer application 152 displays (e.g., on the product page 228) to the customer 112A (see FIG. 1). The customer 112A (see FIG. 1) may select the product options 230B and 230B and provide information for each selected product option that the customer application 152 sends to the product reservation module 140 (see FIG. 1). Referring to FIG. 1, the product reservation module 140 adds this information the wish list 226 so that the product reservation module 140 might assign a potential reservation of an appropriate instance of the product "SKU1" to the customer 112A.

Figure 6:
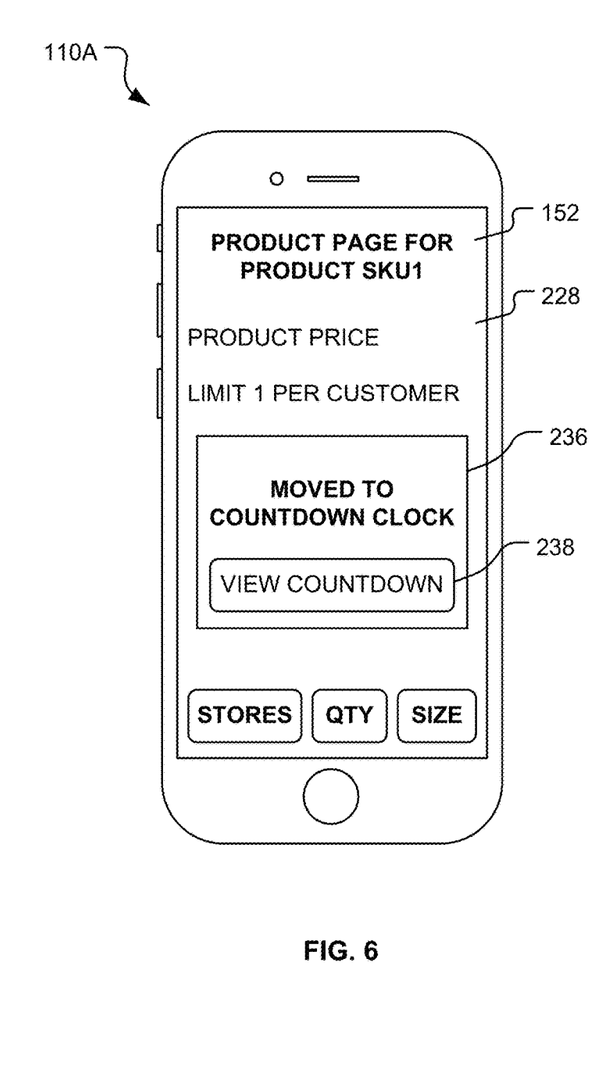
FIG. 6 is an illustration of a confirmation message displayed on the product page of FIG. 4.

After the customer 112A has provided the information necessary to request the reservation, the product reservation module 140 may send a confirmation to the customer application 152 indicating that the request has been received and the product "SKU1" has been added to the wish list 226 associated with the customer 112A. Referring to FIG. 6, the customer application 152 may display a confirmation message 236 (e.g., "moved to countdown clock") to the customer 112A (see FIG. 1) indicating that the product "SKU1" has been added to the wish list 226 (see FIG. 1) and the customer 112A may be selected (e.g., via a lottery or other contest) by the product reservation module 140 to have the opportunity to purchase the product "SKU1." Optionally, the customer application 152 may display a link or button 238 that when selected causes the customer application 152 to display a countdown page 240 (see FIG. 8).

Referring to FIG. 8, the countdown page 240 includes the default and personal countdown clocks 214 and 216. As mentioned above, when first generated by the product reservation module 140, the default and personal countdown clocks 214 and 216 may be identical. However, the customer 112A may modify the personal countdown clock 216 (e.g., by subtracting a head start amount of time from the personal countdown clock 216 before the personal countdown clock 216 counts down to zero).

Optionally, in block 224 (see FIG. 2), the customer 112A (see FIG. 1) may modify the personal countdown clock 216 associated with the customer 112A. For example, the customer 112A (see FIG. 1) may apply a head start (e.g., five minutes) to the personal countdown clock 216 that decreases the amount of time before the personal countdown clock 216 counts down to zero. However, the default countdown clock 214 remains unchanged. As mentioned above, the personal countdown clock 216 applies only to the customer 112A (see FIG. 1). However, the product reservation module 140 (see FIG. 1) may generate other personal countdown clocks (not shown) that apply to other customers.

Figure 7:
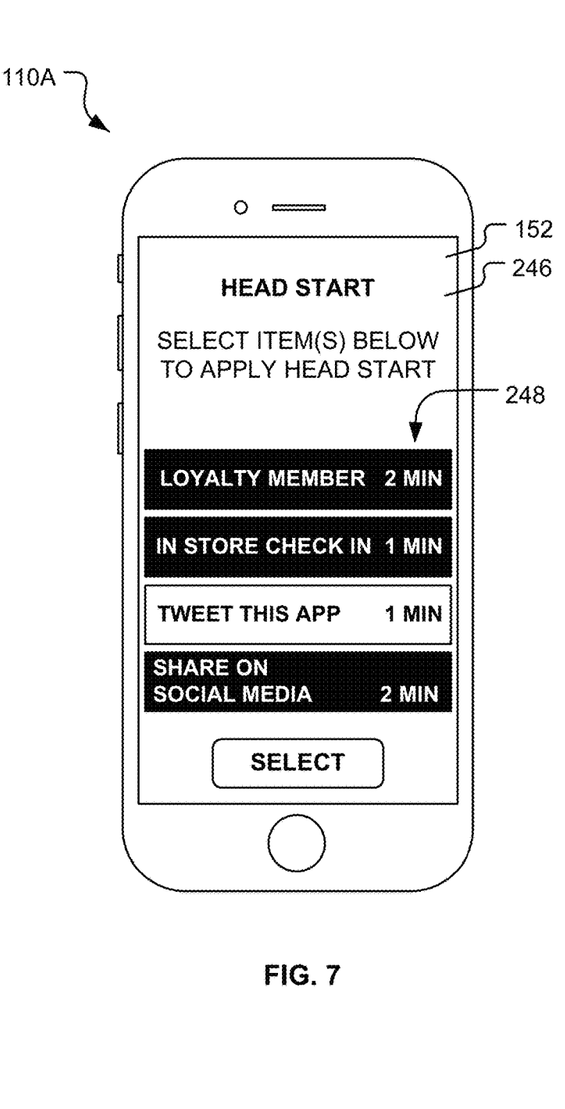
FIG. 7 is an illustration of a head start page displayed by one of the customer computing devices of the system of FIG. 1.

FIG. 7 illustrates a head start page 246 that the customer application 152 may display to the customer 112A (see FIG. 1). The customer 112A (see FIG. 1) may select one or more items 248 each associated with an amount of time. When the customer 112A (see FIG. 1) selects one or more of these items 248, the associated amount of time is subtracted from the personal countdown clock 216 (see FIG. 8) but only for the customer 112A. The customer 112A (see FIG. 1) may earn some of the items 248 illustrated on the head start page 246. By way of a non-limiting example, the customer 112A (see FIG. 1) may earn one or more of the items 248 by having achieved a certain status (e.g., a VIP Customer, a Platinum Customer, and the like) with the system 100 (see FIG. 1) or the merchant 122A (see FIG. 1). By way of another non-limiting example, the customer 112A (see FIG. 1) may earn one or more of the items 248 by physically going into one of the store locations 160A and 160B (see FIG. 1) operated by the merchant 122A (see FIG. 1) and checking in with the system 100 (see FIG. 1) to provide evidence of the visit to the store location. For example, referring to FIG. 1, the customer computing device 110A may detect the proximity signal 182 (see FIG. 10) directly from the proximity beacon 172 and transmit the store location code to the product reservation module 140 as evidence that the customer 112A visited the store location. Alternatively, the customer 112A may enter a predetermined pin (e.g., a four digit pin) associated only with that store location and the customer computing device 110A may send the predetermined pin to the product reservation module 140 as evidence that the customer 112A visited the store location.

Referring to FIG. 1, in block 250 (see FIG. 2), the product reservation module 140 performs a status assignment process for the product "SKU1" that determines a status for each of the customers 112A-112C who requested to reserve the product "SKU1" in block 224. In block 250, the product reservation module 140 may run the ASA 144, which may be configured to implement a lottery that is used to assign a status to each of the customers 112A-112C who requested to reserve the product "SKU1" in block 224.

By way of a non-limiting example, the status may include "won," "waitlisted," and "lost." The status "won" indicates that the customer 112A has the opportunity to reserve the product "SKU1." The status "waitlisted" indicates that the customer 112A might have the opportunity to reserve the product "SKU1" if enough other customers who were assigned the status "won" decide not to reserve or purchase the product "SKU1." The status "lost" indicates that the customer 112A will not be given the opportunity to reserve the product "SKU1." Thus, the product reservation module 140 determines which of the customers 112A-112C will ultimately have chance of purchasing the product "SKU1." For example, if the customers 112A-112C include 5000 customers who have each added the product "SKU1" for the store location 160A to their wish lists but the store location 160A has only 500 units of the product "SKU1" available, the ASA 144 decides which of the 5000 customers are provided the opportunity to purchase the product "SKU1."

The product reservation module 140 performs block 250 (see FIG. 2) with respect to each of the customers 112A-112C when the personal countdown clock 216 (see FIG. 8) associated with each of the customers 112A-112C counts down to zero. Thus, the product reservation module 140 may perform block 250 (see FIG. 2) at different times for different customers. For example, if there are only two instances of the product "SKU1," and the personal countdown clock 216 (see FIG. 8) associated with the customer 112A counts down to zero before the personal countdown clocks of the other two customers 112B and 112C, when the personal countdown clock 216 (see FIG. 8) associated with the customer 112A counts down to zero, the product reservation module 140 assigns the status "won" to the customer 112A. If the personal countdown clocks of the customers 112B and 112C count down to zero at the same time, the ASA 144 selects (e.g., randomly) one of the customers 112B and 112C and assigns the status "won" to that customer when the personal countdown clocks of the customers 112B and 112C count down to zero. The other unselected customer may be assigned the status "waitlisted" or the status "lost."

As mentioned above, the ASA 144 may select winning customers randomly from those customers whose personal countdown clocks have reached zero. Alternatively, the ASA 144 may decide which of the customers 112A-112C whose personal countdown clocks have reached zero is to be assigned the status "won" based on several factors. By way of non-limiting examples, these factors may include loyalty status of each of the customers 112A-112C, number of in-store visits (as measured by the customer application 152) made by each of the customers 112A-112C, purchase history of each of the customers 112A-112C, number of times each of the customers 112A-112C failed to pick up a product after confirming that the customer would pick up the product, and the like. The ASA 144 may be designed to be extensible and take inputs from recursive analysis (e.g., what status has the customer 112A been assigned in the past) as well as machine learning outputs.

Figure 9:
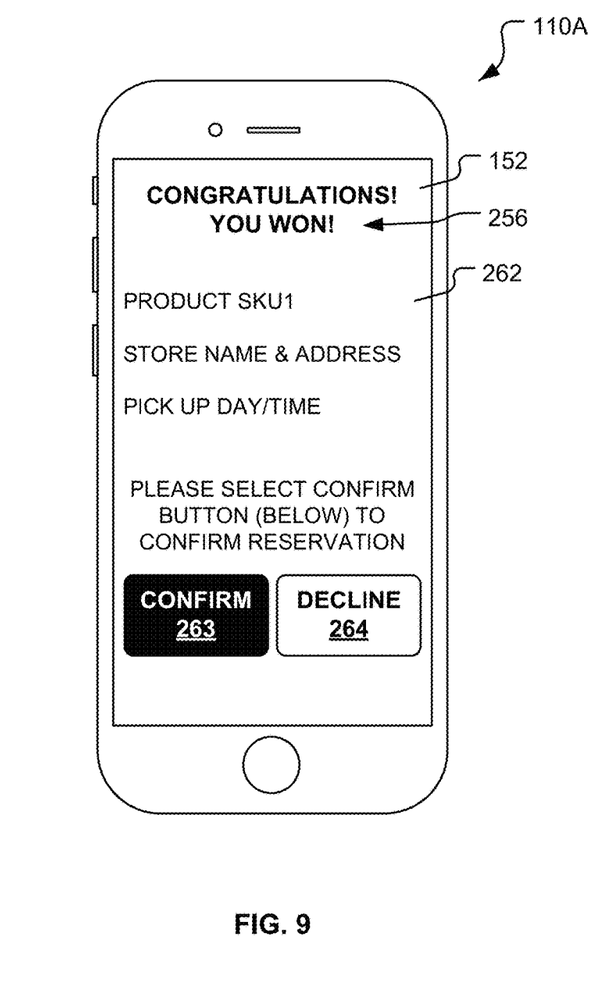
FIG. 9 is an illustration of a confirmation page displayed by one of the customer computing devices of the system of FIG. 1.

In block 255 (see FIG. 2), the product reservation module 140 notifies each of the customers 112A-112C as to their respective status. Thus, the product reservation module 140 sends a notification to the customer application 152 with the status of the customer 112A. Referring to FIG. 9, the customer application 152 displays a status notification 256 (e.g., "YOU WON") to the customer 112A (see FIG. 1).

Referring to FIG. 2, in decision block 258, the product reservation module 140 (see FIG. 1) decides how to proceed with respect to each of the customers 112A-112C (see FIG. 1) based on their respective statuses. For example, referring to FIG. 1, the product reservation module 140 decides how to proceed with respect to the customer 112A based on the status assigned to the customer 112A.

If the status assigned to the customer 112A is "lost," the customer 112A has not been awarded the opportunity to reserve the product "SKU1" for purchase. When this occurs, the method 200 (see FIG. 2) terminates. Optionally, if the product launch of the product "SKU1" has not yet ended, the customer 112A may return to the product launch page 220 and provide another customer submission (in block 224). For example, the customer 112A may try to reserve a different instance (e.g., a different size, a different color, etc.) of the product "SKU1."

If the status assigned to the customer 112A is "won," the customer 112A has been awarded the opportunity to reserve the product "SKU1" for purchase. In block 260 (see FIG. 2), the product reservation module 140 assigns a potential reservation to the customer 112A that the customer 112A can turn into an actual reservation. The potential reservation may specify one of the store locations 160A and 160B. The product reservation module 140 communicates to the customer application 152 if an action (e.g., confirmation) is required by the customer 112A to convert the potential reservation into an actual reservation. For example, referring to FIG. 9, the customer application 152 may display a confirmation page 262 with a confirm button 263 that the customer 112A (see FIG. 1) may select to confirm the reservation. Optionally, the confirmation page 262 may include a decline button 264 that the customer 112A (see FIG. 1) may select to decline the reservation. Referring to FIG. 1, the product reservation module 140 may give the customer 112A a limited amount of time to confirm the reservation after the product reservation module 140 notifies the customer 112A of the status "won."

In decision block 265 (see FIG. 2), the product reservation module 140 determines whether the customer 112A has confirmed the reservation (e.g., by selecting the confirm button 263 illustrated in FIG. 9) within the limited amount of time. The decision in decision block 265 (see FIG. 2) is "YES," when the customer 112A has confirmed the reservation within the limited amount of time. Otherwise, the decision in decision block 265 (see FIG. 2) is "NO."

When the decision in decision block 265 (see FIG. 2) is "NO," in block 270, the potential reservation expires. Thus, the customer 112A has lost the opportunity to reserve the product "SKU1" for purchase. Then, in block 272, the product reservation module 140 may reassign the instance of the product "SKU1" to one of those of the customers who were assigned the status "waitlisted." After block 272, the method 200 terminates.

Referring to FIG. 2, when the decision in decision block 265 is "YES," in block 274, the product reservation module 140 (see FIG. 1) converts the potential reservation into an actual reservation. The actual reservation may specify one of the store locations 160A and 160B. For example, referring to FIG. 1, the ASA 144 may assign an instance of the product "SKU1" in the inventory 180A at the store location 160A to the customer 112A. The product reservation module 140 may provide detailed instructions to the customer application 152 regarding pick up of the product "SKU1 at the selected store location. For example, the product reservation module 140 may send this information to the customer application 152, which may display this information on a product pick up page 275 (see FIG. 10).

An economic transaction may or may not be required to secure the actual reservation. For example, the customer 112A may purchase the product "SKU1" using the customer application 152. Alternatively, the customer 112A may purchase the product "SKU1" at the selected store location when the customer 112A picks up the instance of the product "SKU1" assigned to the customer 112A.

To pick up the product "SKU1" (e.g., at the store location 160A), the customer 112A and/or the customer computing device 110A may be required to supply validation information to the product reservation module 140 (e.g., within a predetermined amount of time following confirmation). After the product reservation module 140 receives the validation information (e.g., the store location code), the product reservation module 140 determines whether the validation information satisfies validation criteria. The validation criteria may be used to validate the user and/or the customer computing device 110A. Non-limiting examples of the validation information may include one or more of the following:

1. An indication of proximity to the proximity beacon 172, which may be implemented as a Bluetooth enabled Beacon, an AKA Beacon, an iBeacon, or a Bluetooth Low Energy ("BLE") device;
2. A physical location of the customer computing device 110A (e.g., at the store location 160A), which may be identified (e.g., a latitude and a longitude) by a location module 488 (see FIG. 11), such as a conventional geolocation or Global Positioning System ("GPS") module, of the customer computing device 110A;
3. An in-store unlock code or pin (e.g., provided manually by an employee, such as a store associate, of the merchant 122A);
4. One or more commonly used identifiers, such as a Unique Device Identifier ("UDID"), a Universally Unique Identifier ("UUID"), an Android DeviceID, one or more cookies, and any other identifier defined by the product reservation computing system 130;
5. A digital user authentication, which may include authenticating a user name and password, authenticating a biometric signature, and/or other commonly used authentication models or methods;
6. Physical user authentication, which may include an indication that an employee of the merchant 122A has authenticated a government issued identification presented by the customer 112A.

For example, the validation criteria may include evidence that the customer 112A is physically at the store location 160A. The product reservation module 140 may determine this validation criteria is satisfied when the product reservation module 140 receives an indication (e.g., the store location code) from the customer computing device 110A that the customer computing device 110A has detected (e.g., using the optional reader application 154) the proximity signal 182 (see FIG. 10) transmitted by the proximity beacon 172 at the store location 160A. After detecting the proximity signal 182 (see FIG. 10) directly from the proximity beacon 172, the customer computing device 110A transmits the indication (e.g., the store location code) to the product reservation module 140, which uses this information to determine whether the validation criteria is satisfied. The customer computing device 110A may detect the proximity signal 182 (see FIG. 10) directly from the proximity beacon 172 when the customer computing device 110A is within a transmission distance of the proximity beacon 172.

In decision block 276 (see FIG. 2), the product reservation module 140 determines whether the customer 112A has satisfied the validation criteria (e.g., within the predetermined amount of time following confirmation). If the validation criteria is/are satisfied, the decision in decision block 276 (see FIG. 2) is "YES." Otherwise, the decision in decision block 276 (see FIG. 2) is "NO."

When the decision in decision block 276 (see FIG. 2) is "NO" and the predetermined amount of time following confirmation has expired, in block 280 (see FIG. 2), the product reservation module 140 records that the customer 112A failed to pick up the product "SKU1." This information may be used by the product reservation module 140 in the future to determine, at least in part, if the customer 112A will be given the opportunity to request reservations of other products being launched using the product reservation module 140. Then, in optional block 282, if the customer 112A did not pay for the product "SKU1," the product reservation module 140 may release the instance of the product "SKU1" reserved for the customer 112A and reassign the instance to one of those customers who were assigned the status "waitlisted." After optional block 282, the method 200 terminates.

When the decision in decision block 276 (see FIG. 2) is "YES," in block 285 (see FIG. 2), the product reservation module 140 performs a promotion process. For example, the customer 112A may travel to the store location 160A and pick up the instance of the product "SKU1" from the inventory 180A. If the instance of the product "SKU1" was not purchased in block 274, the customer 112A purchases the instance of the product "SKU1" at the store location 160A.

Referring to FIG. 10, the promotion process may include the product reservation module 140 (see FIG. 1) sending a code 286 (e.g., an alphanumeric code, a one-dimensional barcode, a two-dimensional barcode, a Quick Response ("QR") code, and the like) to the customer application 152. In some embodiments, the product reservation module 140 (see FIG. 1) transmits the code 286 to the customer computing device 110A after the product reservation module 140 determines the validation criteria has been satisfied. The code 286 sent to the validated customers may be unique to each customer. When the customer 112A (see FIG. 1) picks up the product "SKU1," the customer 112A provides the code 286 to the merchant 122A (see FIG. 1) as proof that the customer 112A has been authorized to purchase the product "SKU1." The customer application 152 (see FIG. 1) may transmit or display the code 286 to the merchant 122A (see FIG. 1) using the customer computing device 110A. By way of non-limiting examples, the customer application 152 may transmit the code 286 (e.g., to the merchant computing system 120A illustrated in FIG. 1) using Bluetooth, BLE, any other near-field communication mode, and the like. Referring to FIG. 1, the merchant application 150 may confirm the validity of the code 286 (see FIG. 10) and display a message indicating that the customer 112A is authorized to purchase the product "SKU1" at the store location 160A.

Alternatively and/or additionally, the code 286 (see FIG. 10) may be displayed (e.g., via the display device 430 (see FIG. 11) of the customer computing device 110A) to the merchant 122A. For example, the merchant 122A may scan (e.g., using a conventional barcode reader, not shown) the code 286 (see FIG. 10) into the merchant application 150. The merchant application 150 may confirm the validity of the code 286 (see FIG. 10) and display a message indicating that the customer 112A is authorized to purchase the product "SKU1" at the store location 160A.

Optionally, the customer 112A may inform the customer application 152 (e.g., click a link or a button 288 (see FIG. 10) displayed by the customer application 152) that the product "SKU1" has been picked up. In turn, the customer application 152 may inform the product reservation module 140 that the product "SKU1" has been picked up.

Optionally, the merchant 122A and/or the merchant application 150 inform the product reservation module 140 that the customer 112A has picked up the product "SKU1."

Referring to FIG. 2, the method 200 terminates after block 285.

Referring to FIG. 1, the ASA 144 may run multiple additional times (e.g., until all of the instances of the product "SKU1" are assigned to a customer or the product launch has ended) and/or change the status of the customers from "waitlisted" to either "won" or "lost." In decision block 290 (see FIG. 2), the product reservation module 140 determines whether the status of the waitlisted customer 112A has been updated to "won." As mentioned above, if the customer 112A was assigned the status "waitlisted," the ASA 144 may assign (e.g., in block 272 or 282 of FIG. 2) the status "won" to the customer 112A if other customers fail to confirm their "won" statuses (as determined in decision block 265 of FIG. 2) or fail to validate (as determined in decision block 276 of FIG. 2) and did not pay for the product "SKU1." If the ASA 144 assigns the status "won" to the customer 112A, in block 260 (see FIG. 2), the ASA 144 also assigns a potential reservation to the customer 112A that the customer 112A may be able to turn into an actual reservation in block 274 (see FIG. 2). Referring to FIG. 2, the decision in decision block 290 is "YES," when the status of the waitlisted customer 112A (see FIG. 1) has been updated to "won." Otherwise, the decision in decision block 290 is "NO."

When the decision in decision block 290 is "YES," the product reservation module 140 (see FIG. 1) advances to block 260 where the ASA 144 assigns the status "won" to the customer 112A.

When the decision in decision block 290 is "NO," in block 295, the launch of the product "SKU1" has ended. For example, in block 295, the instances of the product "SKU1" may have sold out. Optionally, the status of the customer 112A (see FIG. 1) may be changed to "lost." After block 295, the method 200 terminates. Optionally, before block 295, the customer 112A (see FIG. 1) may optionally return to the product launch page 220 and provide another customer submission (in block 224). For example, the customer 112A may try to reserve a different instance (e.g., a different size, a different color, etc.) of the product "SKU1."

Mobile Communication Device

FIG. 11 is a functional block diagram illustrating the mobile communication device 400 that may be used to implement one or more of the customer computing devices 110A-110C of FIG. 1. By way of non-limiting examples, referring to FIG. 11, the mobile communication device 400 may be implemented as a cellular telephone, a tablet computer, and the like. The mobile communication device 400 includes a central processing unit (CPU) 410. Those skilled in the art will appreciate that the CPU 410 may be implemented as a conventional microprocessor, application specific integrated circuit (ASIC), digital signal processor (DSP), programmable gate array (PGA), or the like. The mobile communication device 400 is not limited by the specific form of the CPU 410.

The mobile communication device 400 also contains a memory 420. The memory 420 may store instructions and data to control operation of the CPU 410. The memory 420 may include random access memory, ready-only memory, programmable memory, flash memory, and the like. The mobile communication device 400 is not limited by any specific form of hardware used to implement the memory 420. The memory 420 may also be integrally formed in whole or in part with the CPU 410.

The mobile communication device 400 also includes conventional components, such as the display device 430 and one or more user input devices 440 (e.g., buttons, a keypad, a keyboard, and the like). These are conventional components that operate in a known manner and need not be described in greater detail. The display device 430 may be implemented as a touch display or touchscreen configured to receive user input (e.g., selections from the list 222, a selection of the store option 230A, selection of the product options 230B and 230C, selections from the list 231, selection of the button 238, selection of the item(s) 248, selection of the confirm button 263 or the decline button 264, selection of the button 288, and the like). By way of non-limiting examples, the display device 430 is operable to display the screens and pages (e.g., the product launch page 220, the product page 228, the store selection page 232, the head start page 246, the countdown page 240, a confirmation page 262, and the product pick up page 275) depicted in FIGS. 3-10, and the like.

The memory 420 stores computer executable instructions that when executed by the CPU 410 cause the CPU 410 to generate the screens and interfaces described above and displayed by the display device 430. Referring to FIG. 1, the memory 420 (see FIG. 11) also stores computer executable instructions that when executed by the CPU 410 implement the customer application 152, and the optional reader application 154. Such instructions may be stored on one or more non-transitory computer-readable media. Returning to FIG. 11, other conventional components found in wireless communication devices, such as a USB interface, Bluetooth interface, camera/video device, infrared device, and the like, may also be included in the mobile communication device 400. For the sake of clarity, these conventional elements are not illustrated in the functional block diagram of FIG. 11.

The mobile communication device 400 also includes a network transmitter 450 such as may be used by the mobile communication device 400 for normal network wireless communication with the network(s) 134 (see FIG. 1), such as with a base station (not shown) of a cellular network. FIG.

11 also illustrates a network receiver 460 that operates in conjunction with the network transmitter 450 to communicate with the network(s) 134 (see FIG. 1), such as with the base station (not shown) of the cellular network. In a typical embodiment, the network transmitter 450 and network receiver 460 are implemented as a network transceiver 470. The network transceiver 470 is connected to an antenna 480. Operation of the network transceiver 470 and the antenna 480 for communication with the network(s) 134 (see FIG. 1) is well-known in the art and need not be described in greater detail herein.

While not illustrated in FIG. 11, referring to FIG. 10, as mentioned above, the mobile communication device 400 (see FIG. 11) includes hardware components (e.g., a transmitter, a receiver, and an antenna) configured to receive the proximity signal 182 from the proximity beacon 172. The mobile communication device 400 (see FIG. 11) also includes software components (e.g., the optional reader application 154 stored in the memory 420 illustrated in FIG. 11) required to detect the proximity signal 182 transmitted by the proximity beacon 172 and read the store location code encoded in the proximity signal 182.

Referring to FIG. 11, as mentioned above, the mobile communication device 400 may also include the location module 488 (e.g., a conventional geolocation or GPS module) operable to determine the current location of the mobile communication device 400.

The various components illustrated in FIG. 11 are coupled together by a bus system 490. The bus system 490 may include an address bus, data bus, power bus, control bus, and the like. For the sake of convenience, the various busses in FIG. 4 are illustrated as the bus system 490.

The memory 420 may store instructions executable by the CPU 410. The instructions may implement portions of the method 200 illustrated in FIG. 2. Such instructions may be stored on one or more non-transitory computer or processor readable media.

Computing Device

Figure 12:
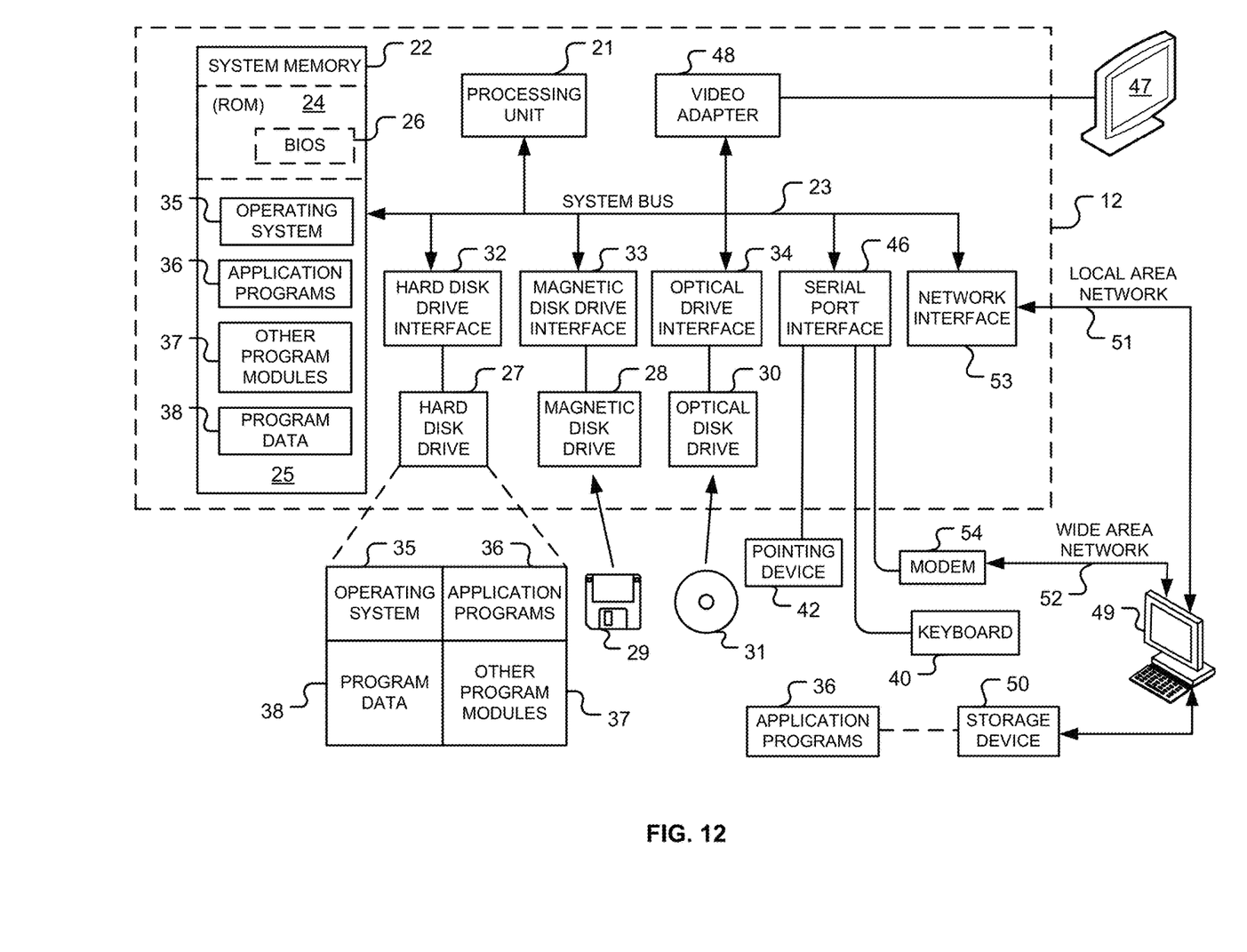
FIG. 12 is a diagram of a hardware environment and an operating environment in which computing devices of the system of FIG. 1 may be implemented.

FIG. 12 is a diagram of hardware and an operating environment in conjunction with which implementations of the one or more computing devices of the system 100 may be practiced. The description of FIG. 12 is intended to provide a brief, general description of suitable computer hardware and a suitable computing environment in which implementations may be practiced. Although not required, implementations are described in the general context of computer-executable instructions, such as program modules, being executed by a computer, such as a personal computer. Generally, program modules include routines, programs, objects, components, data structures, etc., that perform particular tasks or implement particular abstract data types.

Moreover, those of ordinary skill in the art will appreciate that implementations may be practiced with other computer system configurations, including hand-held devices, multi-processor systems, microprocessor-based or programmable consumer electronics, network PCs, minicomputers, mainframe computers, and the like. Implementations may also be practiced in distributed computing environments (e.g., cloud computing platforms) where tasks are performed by remote processing devices that are linked through a communications network. In a distributed computing environment, program modules may be located in both local and remote memory storage devices.

The exemplary hardware and operating environment of FIG. 12 includes a general-purpose computing device in the form of the computing device 12. Each of the computing devices mentioned above, including those illustrated in FIG. 1 (e.g., the customer computing devices 110A-110C, the merchant computing systems 120A and 120B, and the product reservation computing system 130), may be substantially identical to the computing device 12. By way of non-limiting examples, the computing device 12 may be implemented as a laptop computer, a tablet computer, a web enabled television, a personal digital assistant, a game console, a smartphone, a mobile computing device, a cellular telephone, a desktop personal computer, a blade computer, and the like.

The computing device 12 includes a system memory 22, the processing unit 21, and a system bus 23 that operatively couples various system components, including the system memory 22, to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof, and the like.

The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24. The computing device 12 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those of ordinary skill in the art that any type of computer-readable media which can store data that is accessible by a computer, such as magnetic cassettes, flash memory cards, solid state memory devices ("SSD"), USB drives, digital video disks, Bernoulli cartridges, random access memories ("RAMs"), read only memories ("ROMs"), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, SSD, USB drives, and the like) accessible by the processing unit 21 may be considered components of the system memory 22.

A number of program modules may be stored on the hard disk drive 27, magnetic disk 29, optical disk 31, ROM 24, or RAM 25, including the operating system 35, one or more application programs 36, other program modules 37, and program data 38. A user may enter commands and information into the computing device 12 through input devices such as a keyboard 40 and pointing device 42. Other input devices (not shown) may include a microphone, joystick, game pad, satellite dish, scanner, touch sensitive devices (e.g., a stylus or touch pad), video camera, depth camera, or the like. These and other input devices are often connected to the processing unit 21 through a serial port interface 46 that is coupled to the system bus 23, but may be connected by other interfaces, such as a parallel port, game port, a universal serial bus (USB), or a wireless interface (e.g., a Bluetooth interface). A monitor 47 or other type of display device is also connected to the system bus 23 via an interface, such as a video adapter 48. In addition to the monitor, computers typically include other peripheral output devices (not shown), such as speakers, printers, and haptic devices that provide tactile and/or other types of physical feedback (e.g., a force feedback game controller).

The input devices described above are operable to receive user input and selections. Together the input and display devices may be described as providing a user interface.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 12 include a local-area network (LAN) 51 and a wide-area network (WAN) 52. Such networking environments are commonplace in offices, enterprise-wide computer networks, intranets and the Internet. The network(s) 134 (see FIG. 1) may be implemented using one or more of the LAN 51 or the WAN 52 (e.g., the Internet).

Those of ordinary skill in the art will appreciate that a LAN may be connected to a WAN via a modem using a carrier signal over a telephone network, cable network, cellular network, or power lines. Such a modem may be connected to the computing device 12 by a network interface (e.g., a serial or other type of port). Further, many laptop computers may connect to a network via a cellular data modem.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

In some embodiments, the system memory 22 stores computer executable instructions that when executed by one or more processors cause the one or more processors to perform all or portions of one or more of the methods (including the method 200 illustrated in FIG. 2) described above. Such instructions may be stored on one or more non-transitory computer-readable media.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations,"

without other modifiers, typically means at least two recitations, or two or more recitations).

Accordingly, the invention is not limited except as by the appended claims.

The invention claimed is:

1. A system comprising:
   a memory; and
   one or more processors coupled to the memory and configured for a product reservation computing system such that the one or more processors are configured to perform operations comprising:
   receiving requests to purchase a product from a merchant when the product is not yet available for purchase;
   processing the requests to purchase the product using an assignment script algorithm to select customers that will be allowed to purchase the product from the merchant;
   generating a default countdown clock that indicates when potential reservations will be assigned to the customers selected by the assignment script algorithm;
   generating a personal countdown clock that indicates when a personal reservation will be assigned for a winning customer, the personal countdown clock being identical to the default countdown clock when generated;
   receiving a head start amount of time for the personal reservation;
   subtracting the head start amount of time from the personal countdown clock, wherein the head start amount of time is subtracted when the head start amount of time is received from the winning customer, and wherein the head start amount of time is subtracted before the personal countdown clock counts down to zero; and
   initiating assignment of the personal reservation to the winning customer in response to the personal countdown clock reaching zero, wherein the assignment expedites sale of the product to the customers selected by the assignment script algorithm before the product is available to customers not selected by the assignment script algorithm.

2. The system of claim 1, wherein the one or more processors are further configured to:
   receive confirmations from a confirmed portion of winning customers including the winning customer;
   convert the potential reservations to actual reservations for the confirmed portion of the winning customers; and
   transmit a code to the winning customer only after the winning customer submits validation information to the product reservation computing system and the product reservation computing system determines that the validation information satisfies validation criteria, with merchant transfer of the product to the winning customer at a physical store location authorized only if a customer computing device associated with the winning customer provides the code to the merchant.

3. The system of claim 2, further including:
   a proximity beacon transmitting a proximity signal, the proximity beacon being located at the physical store location of the merchant, with the customer computing device being operable to detect the proximity signal directly from the proximity beacon when the customer computing device is within a transmission distance of the proximity beacon, the validation information including an indication that the customer computing device operated by the winning customer detected the proximity signal.

4. The system of claim 2, wherein the customer computing device operated by the winning customer provides the code to the merchant by at least one of displaying the code and transmitting the code to a merchant computing system.

5. The system of claim 2, wherein the product reservation computing system transmits the code to a customer application operated by each of the confirmed portion of the winning customers only after the merchant provides an unlock code to the customer application; and
   wherein the validation information includes the unlock code.

6. The system of claim 2, wherein the system is configured for communication with a waitlisted customer computing device operated by a waitlisted customer who was not assigned one of the potential reservations;
   wherein the winning customers include an unconfirmed customer who was not included in the confirmed portion of the winning customers; and
   wherein the product reservation computing system reassigns the one of the potential reservations assigned to the unconfirmed customer to the waitlisted customer.

7. The system of claim 6, wherein the product reservation computing system receives a confirmation from the waitlisted customer, converts the one of the potential reservation reassigned to the waitlisted customer to an actual reservation, and transmits the code to the waitlisted customer computing device only after the waitlisted customer submits the validation information to the product reservation computing system and the product reservation computing system determines the validation information satisfies the validation criteria; and
   wherein the merchant transfers the product to the waitlisted customer at the physical store location only if the waitlisted customer computing device provides the code to the merchant.

8. The system of claim 2, wherein the validation information includes at least one of a first indication that the customer computing device operated by the winning customer has detected an in-store beacon, a physical location of the customer computing device operated by the winning customer, an unlock code supplied by an employee of the merchant, a Unique Device Identifier ("UDID"), a Universally Unique Identifier ("UUID"), an Android Device ID, one or more cookies, a user name, a password, a biometric signature, and a second indication that the employee authenticated a government issued identification presented by the winning customer.

9. The system of claim 1, wherein the product reservation computing system identifies the winning customer using a lottery process.

10. A method comprising:
    receiving, by a product reservation computing system, requests to purchase a product from a merchant when the product is not yet available for purchase;
    processing the requests to purchase the product using an assignment script algorithm to select customers that will be allowed to purchase the product from the merchant;
    generating a default countdown clock that indicates when potential reservations will be assigned to the customers selected by the assignment script algorithm;
    generating a personal countdown clock that indicates when a personal reservation will be assigned for a winning customer, the personal countdown clock being identical to the default countdown clock when generated;

receiving a head start amount of time for the personal reservation;

subtracting the head start amount of time from the personal countdown clock, wherein the head start amount of time is subtracted when the head start amount of time is received from the winning customer, and wherein the head start amount of time is subtracted before the personal countdown clock counts down to zero; and initiating assignment of the personal reservation to the winning customer in response to the personal countdown clock reaching zero, wherein the assignment expedites sale of the product to the customers selected by the assignment script algorithm before the product is available to customers not selected by the assignment script algorithm.

11. The method of claim 10 further comprising:

receiving confirmations from a confirmed portion of winning customers including the winning customer;

converting the potential reservations to actual reservations for the confirmed portion of the winning customers; and transmitting a code to the winning customer only after the winning customer submits validation information to the product reservation computing system and the product reservation computing system determines that the validation information satisfies validation criteria, with merchant transfer of the product to the winning customer at a physical store location authorized only if a customer computing device associated with the winning customer provides the code to the merchant.

12. The method of claim 11, further comprising:

transmitting, by a proximity beacon, a proximity signal, the proximity beacon being located at the physical store location of the merchant, with the customer computing device being operable to detect the proximity signal directly from the proximity beacon when the customer computing device is within a transmission distance of the proximity beacon, the validation information including an indication that the customer computing device operated by the winning customer detected the proximity signal.

13. The method of claim 11, wherein the customer computing device operated by the winning customer provides the code to the merchant by at least one of displaying the code and transmitting the code to a merchant computing system.

14. The method of claim 11, wherein the product reservation computing system transmits the code to a customer application operated by each of the confirmed portion of the winning customers only after the merchant provides an unlock code to the customer application; and wherein the validation information includes the unlock code.

15. The method of claim 11 further comprising:

communicating with a waitlisted customer computing device operated by a waitlisted customer who was not assigned one of the potential reservations, wherein the winning customers include an unconfirmed customer who was not included in the confirmed portion of the winning customers;

reassigning the one of the potential reservations assigned to the unconfirmed customer to the waitlisted customer;

receiving a confirmation from the waitlisted customer, converts the one of the potential reservation reassigned to the waitlisted customer to an actual reservation, and transmits the code to the waitlisted customer computing device only after the waitlisted customer submits the validation information to the product reservation computing system and the product reservation computing system determines the validation information satisfies the validation criteria; and initiating transfer of the product to the waitlisted customer at the physical store location only if the waitlisted customer computing device provides the code to the merchant.

16. The method of claim 11, wherein the validation information includes at least one of a first indication that the customer computing device operated by the winning customer has detected an in-store beacon, a physical location of the customer computing device operated by the winning customer, an unlock code supplied by an employee of the merchant, a Unique Device Identifier ("UDID"), a Universally Unique Identifier ("UUID"), an Android Device ID, one or more cookies, a user name, a password, a biometric signature, and a second indication that the employee authenticated a government issued identification presented by the winning customer.

17. The method of claim 11, wherein the product reservation computing system identifies the winning customer using a lottery process.

18. A non-transitory computer readable medium comprising instructions that, when executed by one or more processors of a product reservation computing system, cause the product reservation computing system to perform operations comprising:

receiving requests to purchase a product from a merchant when the product is not yet available for purchase;

processing the requests to purchase the product using an assignment script algorithm to select customers that will be allowed to purchase the product from the merchant;

generating a default countdown clock that indicates when potential reservations will be assigned to the customers selected by the assignment script algorithm;

generating a personal countdown clock that indicates when a personal reservation will be assigned for a winning customer, the personal countdown clock being identical to the default countdown clock when generated;

receiving a head start amount of time for the personal reservation;

subtracting the head start amount of time from the personal countdown clock, wherein the head start amount of time is subtracted when the head start amount of time is received from the winning customer, and wherein the head start amount of time is subtracted before the personal countdown clock counts down to zero; and initiating assignment of the personal reservation to the winning customer in response to the personal countdown clock reaching zero, wherein the assignment expedites sale of the product to the customers selected by the assignment script algorithm before the product is available to customers not selected by the assignment script algorithm.

19. The non-transitory computer readable medium of claim 18, wherein the product reservation computing system is further configured to perform operations comprising:

receiving confirmations from a confirmed portion of winning customers including the winning customer;

converting the potential reservations to actual reservations for the confirmed portion of the winning customers; and transmitting a code to the winning customer only after the winning customer submits validation information to the product reservation computing system and the product reservation computing system determines that the validation information satisfies validation criteria, with merchant transfer of the product to the winning customer at a physical store location authorized only if a customer computing device associated with the winning customer provides the code to the merchant.

20. The non-transitory computer readable medium of claim 19, wherein the product reservation computing system is further configured to perform operations comprising:
transmitting, by a proximity beacon, a proximity signal, the proximity beacon being located at the physical store location of the merchant, with the customer computing device being operable to detect the proximity signal directly from the proximity beacon when the customer computing device is within a transmission distance of the proximity beacon, the validation information including an indication that the customer computing device operated by the winning customer detected the proximity signal.

21. The non-transitory computer readable medium of claim 19, wherein the customer computing device operated by the winning customer provides the code to the merchant by at least one of displaying the code and transmitting the code to a merchant computing system.

22. The non-transitory computer readable medium of claim 19, wherein the product reservation computing system is configured to transmit the code to a customer application operated by each of the confirmed portion of the winning customers only after the merchant provides an unlock code to the customer application; and
wherein the validation information includes the unlock code.

23. The non-transitory computer readable medium of claim 19, wherein the product reservation computing system is further configured for operations comprising:
communicating with a waitlisted customer computing device operated by a waitlisted customer who was not assigned one of the potential reservations, wherein the winning customers include an unconfirmed customer who was not included in the confirmed portion of the winning customers;
reassigning the one of the potential reservations assigned to the unconfirmed customer to the waitlisted customer;
receiving a confirmation from the waitlisted customer, converts the one of the potential reservation reassigned to the waitlisted customer to an actual reservation, and transmits the code to the waitlisted customer computing device only after the waitlisted customer submits the validation information to the product reservation computing system and the product reservation computing system determines the validation information satisfies the validation criteria; and
initiating transfer of the product to the waitlisted customer at the physical store location only if the waitlisted customer computing device provides the code to the merchant.

24. The non-transitory computer readable medium of claim 19, wherein the validation information includes at least one of a first indication that the customer computing device operated by the winning customer has detected an in-store beacon, a physical location of the customer computing device operated by the winning customer, an unlock code supplied by an employee of the merchant, a Unique Device Identifier ("UDID"), a Universally Unique Identifier ("UUID"), an Android Device ID, one or more cookies, a user name, a password, a biometric signature, and a second indication that the employee authenticated a government issued identification presented by the winning customer.

25. The non-transitory computer readable medium of claim 18, wherein the product reservation computing system is further configured to identify the winning customer using a lottery process.

* * * * *